United States Patent [19]

Da Re'

[11] Patent Number: 5,182,335

[45] Date of Patent: Jan. 26, 1993

[54] COMPOSITE MATERIAL FOR THE MOULDING OF FIBRE-REINFORCED UNSATURATED POLYESTER RESIN

[75] Inventor: Mario Da Re', Turin, Italy

[73] Assignee: Fiat Auto SpA, Turin, Italy

[21] Appl. No.: 625,624

[22] Filed: Dec. 4, 1990

Related U.S. Application Data

[63] Continuation of Ser. No. 252,073, Sep. 30, 1988, abandoned.

[30] Foreign Application Priority Data

Sep. 30, 1987 [IT] Italy ............................ 67829 A/87

[51] Int. Cl.$^5$ .......................................... C08L 67/06
[52] U.S. Cl. ........................................ 525/30; 525/28; 525/42; 525/164; 525/444; 525/443; 523/522
[58] Field of Search ................. 525/30, 42, 444, 443; 523/522

[56] References Cited

U.S. PATENT DOCUMENTS

| | | | |
|---|---|---|---|
| 3,882,078 | 5/1975 | Kubota | 523/522 |
| 3,887,515 | 6/1975 | Pennington | 523/522 |
| 4,100,224 | 7/1978 | Hess | 525/64 |
| 4,251,641 | 2/1981 | Arakawa | 525/36 |
| 4,413,072 | 11/1983 | Hess | 523/500 |

*Primary Examiner*—Patricia A. Short
*Attorney, Agent, or Firm*—Sughrue, Mion, Zinn, Macpeak & Seas

[57] ABSTRACT

The addition of elastomeric thermoplastic polymers and melamine resin to the polymer matrix of composite materials for the moulding of fibre-reinforced unsaturated polyester resin improves the surface characteristics, resilience, and mouldabilty and heat resistance thereof.

2 Claims, No Drawings

COMPOSITE MATERIAL FOR THE MOULDING OF FIBRE-REINFORCED UNSATURATED POLYESTER RESIN

This is a continuation of application Ser. No. 07/252,073 filed Sep. 30, 1988, now abandoned.

The present invention relates to composite moulding materials with a fibre-reinforced unsaturated polyester resin base.

The use of moulding materials of the reinforced unsaturated polyester type, such as SMC, BMC and the like, is often associated with problems of weakness due to the nature of the material. Moreover, another problem, typical of this type of material is the production of surface microfractures under flexing loads. In order to overcome these problems, the subject of the present invention is a composite material for the moulding of fibre-reinforced unsaturated polyester resin, characterised in that it includes elastomeric thermoplastic polymers and melamine resin in the polymer matrix.

The elastomeric thermoplastic material is preferably selected from the group consisting of elastomeric thermoplastic polyesters, (e.g. Hytrel (registered trademark) by Du Pont or Arnitel (registered trademark) AKZO), elastomeric thermoplastic polyurethanes (e.g., Desmopan (registered trademark) by Bayer) and thermoplastic rubbers, such as PP-EPDM (e.g. KRATON (registered trademark) by Shell).

Hytrel ® is a thermoplastic copolyester-ether elastomer. It is derived from terephthalic acid, polytetramethylene ether glycol and 1,4-butanediol.

For the melamine resin, the already catalysed product can conveniently be used.

The composite material according to the invention may further include polybutyleneterephthalate and polyethyleneterephthalate crystalline thermoplastic materials. The elastomeric thermoplastic material is incorporated, in the form of impalpable powder or in solvents, into the polymer matrix during the formulation stage of the composite material, which is effected by conventional techniques. The concentration of the thermoplastic polymer in the polymer matrix may vary within a wide range of dependence on the specific polymer in question, selected from the above-mentioned group. Amounts ranging from 5 to 10% wt referred to the moldine compound are preferred. The melamine resin may typically be incorporated in a proportion from 5 to 20% by weight relative to the weight of the composite material.

The addition of the above-mentioned components to the composite material has a positive effect, particularly with reference to the following factors:
improvement in surface appearance
increase in breaking extension
elimination of surface cracks due to flexing,
reduction in surface porosity,
increase in impact strength,
improvement in mouldability,
increase in resistance to heat,
reduction in deformation under load, and
improvement in ability to be pigmented.

It should be remembered that the elastomeric nature of the thermoplastic used interacts with the thermosetting characteristics of the composite material, thereby reducing its modulus of elasticity. The melamine partially compensates for this action and, furthermore, becomes disposed at the surface, improving its reflectivity.

Another positive aspect is the increase in surface "slippability" which facilitates removal from the dies, reducing the risk of local fractures.

The composite material according to the invention is suitable for moulding by injection or compression moulding and is particularly suitable for the production of structural elements obtainable by the sandwich moulding method which is the subject of a patent application filed on the same date by the applicant and entitled: "Method for the production of structural elements of plastics material, particularly component parts of motor vehicle bodies by injection moulding".

I claim:

1. A composite moulding material with a fiber-reinforced unsaturated polyester resin base which comprises a thermoplastic copolyester-ether elastomer derived from terephthalic acid, polytetramethylene ether glycol and 1,4-butanediol and melamine resin in the unsaturated polyester resin base, wherein the melamine resin is present in an amount of from 5 to 20% by weight with respect to the composite material and the thermoplastic copolyester-ether elastomer is present in an amount of from 5 to 10% by weight with respect to the composite material.

2. A composite material according to claim 1, wherein it also includes crystalline thermoplastic polyesters in the polymer matrix.

* * * * *